Dec. 11, 1928.
W. J. PEARMAIN
1,694,980
CLUTCH
Filed Feb. 18, 1927
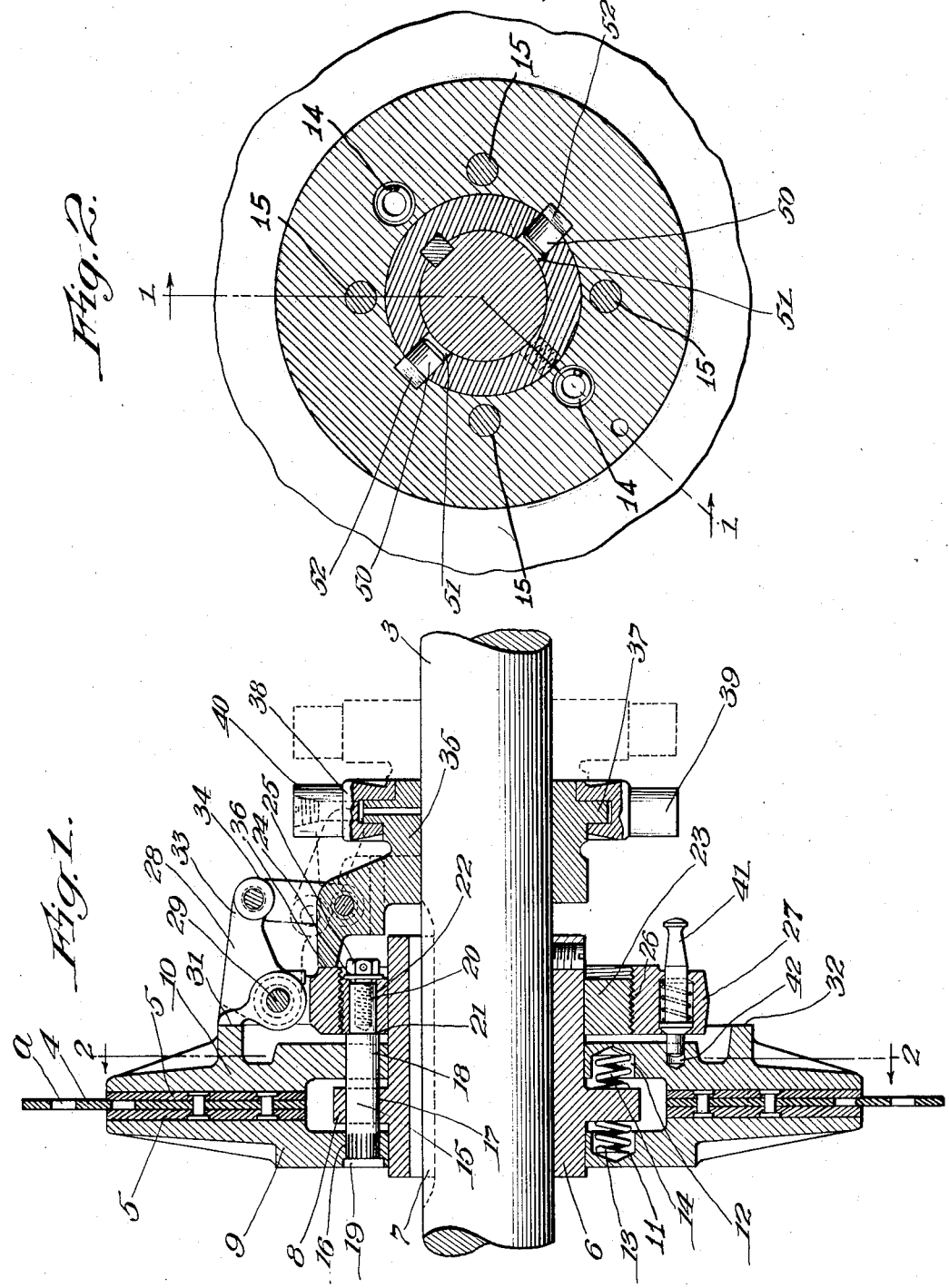

Patented Dec. 11, 1928.

1,694,980

UNITED STATES PATENT OFFICE.

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN.

CLUTCH.

Application filed February 18, 1927. Serial No. 169,346.

My invention relates to that form of clutch in which an intermediate plate, usually but not necessarily attached to the driving member, is gripped between annular members arranged on opposite sides thereof and connected for rotation, when the intermediate member is attached to the driving member, with the driven member. In clutches of this general type as heretofore constructed, one of the annular members for gripping the intermediate plate is integral with or fixed to the hub of the clutch, and therefore, in order that such clutch member may engage and be disengaged from the intermediate plate, it is necessary that either the intermediate plate be movable axially with respect to the driving member to which it is attached or that the hub be movable axially with respect to the shaft. It is in some constructions objectionable or difficult to provide this relative movement, either of the intermediate plate with respect to the driving member or of the hub with respect to the driven shaft. My present invention has the purpose and advantage of permitting the hub to be fixed with relation to the driven shaft and the plate to be fixed with relation to the driving element. In my improved construction the hub and plate are fixed to the respective driven and driving elements and the annular gripping members which engage the intermediate plate are axially movable with respect to the hub.

In the drawings accompanying and forming a part of the present specification Fig. 1 is a diametric section on the plane of line 1—1 of Fig. 2 of my improved clutch, parts being shown in elevation and Fig. 2 a transverse section thereof on the plane of the line 2—2 of Fig. 1.

In the following description I shall refer to the shaft 3 as the driven member and to the plate or disk 4 as attached to the driving member though, manifestly, and as above stated, this relationship may be reversed. The disk 4 is shown as provided with holes $a$ for bolting it to a fly wheel and with facings of friction material 5. The hub 6 of the clutch is keyed immovably to the shaft at 7 and consists of a sleeve portion embracing the shaft and an annular flange or rib 8 integral with the sleeve and surrounding the same intermediate its ends.

The two gripping members 9, 10 are mounted to slide axially upon the sleeve of the hub 6 on opposite sides, respectively, of the rib or flange 8, but are held against rotation with respect thereto by plugs 50 mounted in holes 51 in the hub sleeve and having square heads 52 engaging corresponding notches in the bores of the respective gripping members. At suitable intervals about the sleeve the gripping members are formed with pockets 11, 12, respectively, in which are contained and seated springs 13, 14 which bear upon the intermediate flange 8, and when unresisted, force the gripping members away from and out of contact with the intermediate plate. Any desired number of pairs of springs may be employed. The movement of the friction members on opposite sides of the plate under the action of the springs, is limited by bolts 15. The bolts 15 are arranged intermediate the pairs of springs about the axis of the clutch, each extending through a hole 16 in the gripping member 9, a hole 17 in the flange of the hub and a hole 18 in the gripping member 10. A head 19 on the bolt is countersunk in the clutch member 9 and the other end of the bolt is slightly reduced in diameter as at 20 to form a shoulder 21. The reduced ends of the several bolts extend into holes 22 in an annulus or collar 23 which is also mounted to have a limited sliding movement on the hub 6. The ring 23 is clamped between the shoulder 21 on each bolt 15 and a washer 24 on a screw bolt 25 screwed into said reduced end of the bolt 15. The distance between the head 19 of the bolt and the ring 23 is such as to permit sufficient separation of the clutch members 9, 10 to release the intermediate plate 4 under pressure of springs 13, 14. The periphery of the ring 23 is threaded as at 26 to receive an interiorly threaded fulcrum ring 27 which carries the bell crank levers 28 arranged at suitable intervals about the periphery thereof and fulcrumed on pins 29 extending between pairs of lugs formed integral with said ring between which lugs the levers are pivoted.

The short ends 31 of the levers engage an annular bearing surface 32 formed on the clutch member 10 and the long arms 33 of the levers are connected by links 34 with a sliding collar 35 on shaft 3, by the axial movement of which the levers may be oscillated upon their fulcrums. Preferably the movement of the collar 35 toward the clutch is so limited as to just carry the links past the dead center so that when the clutch is engaged, as shown in Fig. 1, it is releasably locked.

I have shown collar 35 provided with a nose 36 engaging the fulcrum ring 27 for this purpose. The collar 35 is as usual formed with an annular flange 37 engaged by a shifting ring 38, the latter being provided with trunnions 39, 40 for the reception of the shifting lever as usual.

Manifestly, when the collar 35 is shifted to the left, as shown in Fig. 1 in full lines, the bell crank levers press against the annular bearing surface 32 and not only force the gripping member 10 against the plate 4, but also force the fulcrum ring, and through the bolts 15 the gripping member 9, to the right, the bolts 15 sliding through the flange 8, thus gripping the plate 4 between said members 9, 10. Provision is made for taking up wear by screwing the fulcrum ring inward on the ring 23, and when the parts are properly adjusted the fulcrum ring is locked against rotation by a spring-pin 41, provided for the purpose in rings 27 entering one of an annular series of holes 42 in the gripping member 10.

I claim:

1. In a clutch, a hub adapted to be fixed upon a shaft and having an intermediate flange, a friction plate adapted to be fixed upon a rotary part, a pair of gripping members arranged respectively on opposite sides of the friction plate and both axially movable with respect to said hub but rotatable therewith, springs interposed between the respective gripping members and the flange on the hub, a fulcrum ring also movable axially of the shaft, levers on said fulcrum ring engaging one of said gripping members, a connection from said ring to the other of said gripping members and means for actuating said levers to force said gripping members against the plate.

2. In a clutch, a hub adapted to be fixed upon a shaft, a friction plate adapted to be fixed upon a rotary part, a pair of gripping members arranged respectively on opposite sides of the friction plate and both axially movable with respect to the hub but rotatable therewith, a fulcrum ring also axially movable with respect to said hub, bolts connecting said ring with the gripping member on the opposite side of the friction plate from said ring, levers mounted on said ring and engaging the adjacent gripping member and means for oscillating said levers to cause them to bear upon the adjacent gripping member.

3. In a clutch, a hub adapted to be fixed upon a shaft, and having an annular flange intermediate its ends, a friction plate adapted to be fixed to a rotary part, a pair of gripping members slidably mounted upon said hub respectively on opposite sides of said friction plate and flange, a fulcrum ring sliding upon said hub, bolts connecting said ring with the gripping member on the opposite side of said flange and friction plate from said ring and extending through said flange, levers mounted on the fulcrum ring and engaging the adjacent gripping member and means for swinging said levers to force said gripping members into contact with the friction plate.

4. In a clutch, a hub adapted to be fixed upon a shaft and having an annular flange intermediate its ends, a friction plate adapted to be fixed upon a rotary part, a pair of gripping members arranged respectively on opposite sides of said flange and friction plate and having an axial movement on said hub, a ring also having an axial movement on said hub, bolts extending through the adjacent gripping member and the flange and connected to the gripping member remote from said ring, a fulcrum ring axially adjustable on the first said ring, bell crank levers mounted on the fulcrum ring and adapted to bear upon the adjacent gripping member, a sleeve adapted to be mounted on the same shaft with the hub for sliding movement thereon and links connecting said sleeve with the levers.

In testimony whereof, I have subscribed my name.

WILLIAM J. PEARMAIN.